Nov. 2, 1971  R. CAMPARGUE  3,616,596
PROCESS AND DEVICE FOR THE SEPARATION OF
MOLECULES OF DIFFERENT MASSES
Filed Feb. 17, 1969  3 Sheets-Sheet 1

United States Patent Office 3,616,596
Patented Nov. 2, 1971

3,616,596
PROCESS AND DEVICE FOR THE SEPARATION OF MOLECULES OF DIFFERENT MASSES
Roger Campargue, Paris, France, assignor to Commissariat a l'Energie Atomique, Paris, France
Filed Feb. 17, 1969, Ser. No. 799,611
Int. Cl. B01d *57/00*
U.S. Cl. 55—17  8 Claims

ABSTRACT OF THE DISCLOSURE

A gaseous mixture containing molecules of different masses which are to be separated is admitted into a casing at a predetermined pressure through an inlet tube located at a suitable distance from an auxiliary gas inlet nozzle. Said auxiliary gas is admitted into said casing at a supersonic velocity so as to form a jet, the gaseous mixture being extracted along the axis of said auxiliary gas jet through a discharge duct whose rim is placed downstream of the Mach disc or transverse downstream face of the shock structure produced by said jet. The gaseous mixture which is thus extracted is found to be substantially enriched in light molecules.

---

The invention relates to processes and devices for the separation of molecules of different masses which are contained in a gaseous mixture.

The chief aim of the invention is to make these processes and devices such that they conform to the practical requirements more effectively than has been possible up to the present time, especially in regard to separation efficiency.

The invention primarily consists in having recourse to a shock structure for carrying out the separation between the molecules of different masses.

Processes which are already known employ for the same purpose a supersonic jet of the gaseous mixture of the molecules to be separated wherein the heavier molecules to be separated wherein the heavier molecules concentrate near the axis of the jet. The separation efficiency of these processes is nevertheless very low in comparison with the process according to the invention.

The process under consideration is primarily characterized in that it consists in circulating the gaseous mixture within a casing, in introducing an auxiliary gas jet into said casing at a supersonic velocity in order to create a shock structure which is preferably closed and in extracting the gas from the interior of the shock structure, a fraction of the mixture which has a higher concentration of light molecules being contained in said gas.

The process according to the invention differs essentially from the prior art processes in the fact that the gaseous mixture which can be extracted along the axis of the supersonic jet has a higher concentration of light molecules instead of heavy molecules. Moreover, the concentration is much higher.

In a preferred mode of operation, the closed shock structure is constituted by the shock waves produced by the free expansion of the supersonic jet (Mach cell) and the extraction of the gas fraction which is enriched in light molecules takes place upstream of the Mach disc and preferably approximately in the axis of this latter.

In order to carry out the process in accordance with the invention, a device is also proposed for the separation of molecules of different masses. Said device essentially comprises means for circulating the mixture through a casing at low pressure, an opening for the admission within said casing of a jet of auxiliary gas under pressure which creates a shock structure within said casing as a result of free expansion and means whereby a gas fraction which is contained within the interior of the shock structure and which has been enriched in light molecules is extracted through a discharge duct which projects into the interior of said casing opposite to said opening for the admission of the auxiliary gas.

In accordance with secondary characteristics of said device, the means for circulating the gaseous mixture to be processed comprise an admission tube which is placed at a sufficient distance from the auxiliary gas inlet to be located outside the shock structure and which is preferably oriented in such a manner as not to disturb said shock structure, means for pumping the gaseous mixture outside the shock structure, said means being preferably disposed radially around the entire periphery of the auxiliary gas jet.

The operating conditions of the process according to the invention and, in the device referred-to in the foregoing, the axial distance between the auxiliary gas inlet and the upstream rim of the discharge duct are preferably determined in each application in such a manner that said rim should reach the region upstream of the Mach disc, that is to say the downstream transverse face of the stock structure under the applied conditions of operation.

The gaseous mixture to be processed can be of any type whether natural or artificial; the molecules to be separated can be of different nature (e.g. helium and nitrogen contained in natural gas or the rare gases contained in air) or else isotopes of a same simple element (such as the natural elements of rare gases: argon, krypton, xenon or even hydrogen) or isotopic varieties of a same substance (such as the hexafluorides of uranium-235 and uranium-238 or the hexafluorides of sulphur-32, of sulphur-33 and of sulphur-34 and so forth).

The auxiliary gas or "carrier" gas which serves to create the shock structure also serves to entrain the gas fraction which has been enriched in light molecules and which has penetrated into the shock structure (or Mach cell). The auxiliary gas is preferably chosen so that it can readily be separated from the mixture to be treated although this is not an essential requirement. In another advantageous solution, the auxiliary gas can be of the same nature as said mixture. The constituent molecules can indifferently be heavier, lighter or even of the same mass as some of the molecules to be separted.

The supersonic jet of auxiliary gas is formed by free expansion of said gas through an inlet which is provided in the casing and which permits of communication, for example, between said casing and a chamber in which the auxiliary gas is contained at a pressure $P_0$ which is higher than the dynamic pressure $P_1$ which prevails within the casing. Said inlet can be materialized by the mouth of a convergent nozzle which may be conical in shape or not or by the throat of a divergent nozzle or a convergent-divergent nozzle or by a simple opening formed in a flat wall or even by a capillary tube. The inlet is advantageously circular but can also have any geometrical shape, in particular a rectangular shape provided by an elongated slit. Similarly, the discharge duct has advantageously a shape of revolution which is centered on the axis of the shock structure but can also have any geometrical shape (whether thinned-down or not) and the opening of said duct can be of any desired shape and especially a rectangular slit. The opening of the discharge duct is as wide as possible so as to increase the flow rate of the mixture enriched in lighter molecules. It must still be smaller than the Mach disc.

As has been mentioned earlier, a supersonic jet of this type has already been employed for the purpose of carrying out separations of gas molecules. However, in the processes of the prior art, it was the mixture to be processed which underwent expansion and formed the jet, thereby resulting in low enrichment in heavy molecules near the axis of the jet. The phenomena involved appear to be different in the process of the invention in which, on the contrary, the mixture to be treated must be brought to the exterior of the shock structure. Although there is no really adequate explanation for this phenomenon, it is nevertheless observed that, if the gas contained within the interior of the shock structure is collected, the gas is found to contain a fraction of the gaseous mixture which is enriched in light molecules as if said structure (which forms a separation between two zones of the space in which the velocity of flow of the gases is subsonic and supersonic) produced a selective action on the light and heavy molecules as these latter pass through said structure from the exterior towards the interior.

The enrichment factor obtained by means of the process according to the invention can be very high, for example 17% in the case of the natural isotopes of argon.

In order to obtain maximum efficiency, it is an advantage to maintain a pressure $P_1$ of the gaseous mixture within the casing at a value which is lower than 10 millibars but otherwise higher than a value of the order of $10^{-2}$ millibars in order that the mean free path of the molecules of the auxiliary gas should remain shorter than the diameter of the Mach disc.

A few examples of construction of the device according to the invention and of application of the process will now be described by way of non-limitative example, reference being made to the accompanying drawings, in which.

Figure 1:
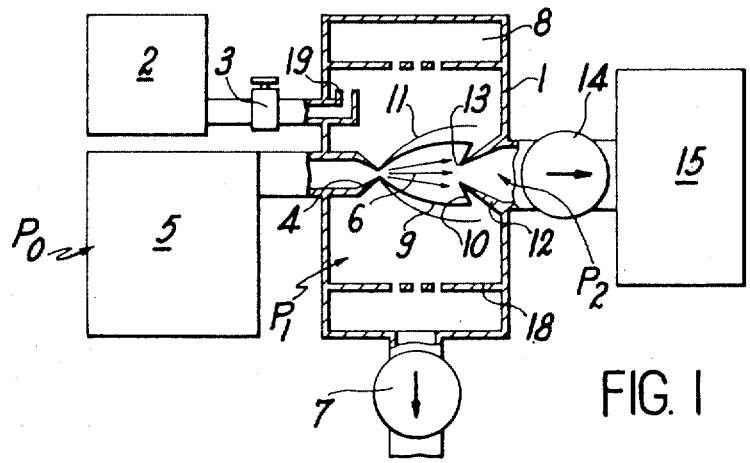
FIG. 1 is a diagrammatic view of a device for separating molecules as constructed in accordance with the invention.

In the device which is represented schematically in FIG. 1, the casing 1 contains the gaseous mixture to be processed which is introduced from a reservoir 2 through a valve 3. Within the same casing 1, auxiliary gas is admitted through a conical convergent nozzle 4 from a reservoir 5 in which is maintained a pressure $P_0$. The casing 1 possesses symmetry of revolution with respect to the axis of the nozzle 4.

In the example of construction herein described, the casing is cylindrical and is surrounded by a peripheral annular chamber 8 limited by a wall 18 having openings which are pierced in the central zone of said wall. A pump 7 which is intended to draw from said annular chamber serves to maintain within the casing 1 a dynamic pressure $P_1$ which is lower than $P_0$, with the result that the admission of the auxiliary gas forms a supersonic jet 6 downstream of the nozzle 4. The pumping action is uniformly distributed around the entire periphery of the auxiliary jet which issues from the nozzle 4. By virtue of this arrangement, the shape of the jet as well as the shock structure which is thus created remain of revolution about the axis of the nozzle.

The pressure $P_1$ sets up a resistance to the flow of the jet 6. This results in the formation of shock waves constituting a shock structure or Mach cell which forms a separation between the zone of the space in which the gas flow velocity is subsonic and the zone in which said velocity is supersonic and corresponds to discontinuity in the properties of the fluid.

Said shock structure which is illustrated at 9 in FIG. 1 has a general shape which is similar to the external surface of a slightly enlarged bullet nose, the point of which is located at the throat of the nozzle 4 and the base 10 of which is substantially flat and is referred-to as a Mach disc. There can also be seen in FIG. 1 the boundary layer 11 beyond which the jet 6 has practically no further influence.

In the form of construction herein described, the admission of the mixture to be processed is prevented from forming a second jet which would be liable to disturb the shock structure by placing the nozzle 4 at a sufficient distance from the tube 19 through which the mixture is admitted and by directing said inlet tube towards the lateral walls of the casing 1.

In order to collect the contents of the Mach cell 9, use is made of a discharge duct 12 having the shape of a divergent nozzle with a circular upstream rim 13 which may be thinned to a sharp edge or not, a low pressure $P_2$ which is lower than $P_1$ being maintained within said duct by means of a pump 14. Said rim 13 is disposed in axially opposite relation to the nozzle 4, preferably at a distance from said nozzle which is equal to the value at which it just swallows the Mach disc (attached front shock wave): it is in fact under these conditions that the contents of the Mach cell 9 can be extracted with the greatest ease without undergoing degradation as a result of passage through a shock wave while above all avoiding the presence of an additional unenriched stream which has not passed through the shock structure and passes directly between the discharge duct and the Mach disc.

The cell contents are conveyed by the pump 14 into a recovery reservoir 15 and that fraction of the initial mixture which is enriched in light molecules and which is contained in said reservoir 15 can then be separated readily from the auxiliary gas (provided of course that said gas is not of the same nature as the mixture referred-to) and can then be subjected if necessary to at least one additional enrichment process. The mixture which has not been collected through the duct 12 constitutes a fraction which is depleted in light molecules and which is drawn out by the pump 7. At the delivery end of said pump 7 and after separation from the auxiliary gas if necessary, the uncollected mixture can be recovered and returned into a previous stage.

FIGS. 2 to 5 show diagrammatically the influence of the axial position of the rim 13 of the extraction duct 12 on the position of the Mach disc 10.

Figure 2:
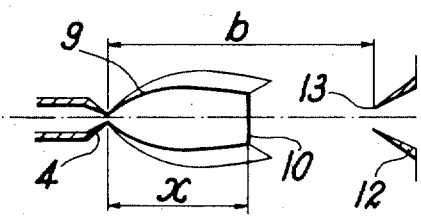
FIGS. 2 to 5 show diagrammatically the influence of the relative axial position of the discharge duct of said device on the shape of the shock structure.

When said rim 13 is relatively remote from the throat of the nozzle 4 as shown in FIG. 2, the axial distance $x$ between said throat and the disc 10 is given by the Formula I as follows:

$$x = 0.67 D_0 (P_0/P_1)^{1/2} \qquad (I)$$

wherein $D_0$ is the diameter of the throat of the nozzle 4, $P_0$ is the pressure which prevails upstream of said nozzle and $P_1$ is the pressure which prevails within the casing 1.

Figure 4:
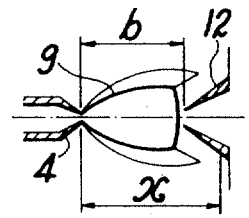
Figure 3:
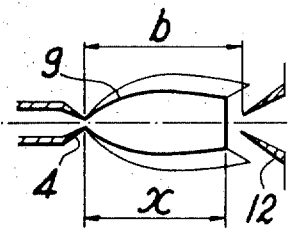
Figure 5:
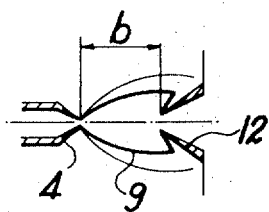

When the extraction duct is moved axially towards the nozzle, the Mach disc first remains stationary as shown in FIG. 3, then recedes in turn towards the nozzle while undergoing deformation as shown in FIG. 4 until the rim 13 of the extraction duct finally comes into contact with said disc and pierces this latter as shown in FIG. 5, whereupon the shock structure is "attached" to said rim 13. This attachment may possibly occur after only a slight withdrawal of the Mach disc, or without only recoil of this normal shock.

In order to permit the above-mentioned attachment without any danger of degradation of the shock structure, the angle at the vertex of the external conical surface of the extraction duct 12 should not be too large and should preferably be smaller than 90°.

Figure 6:
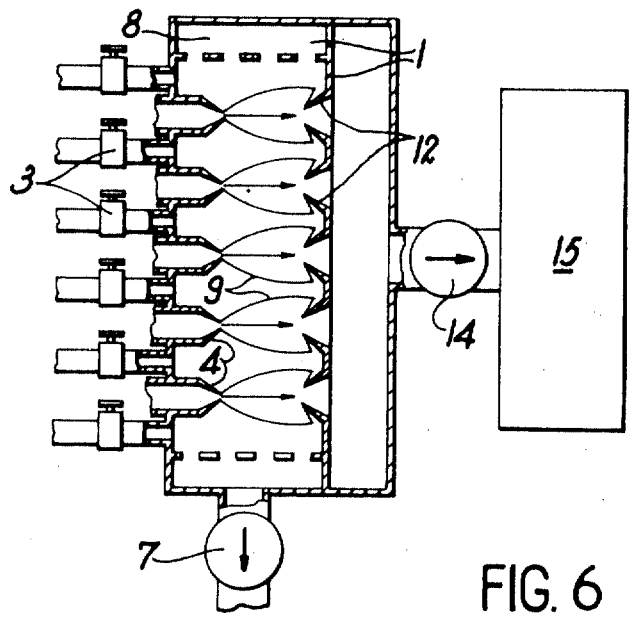
FIG. 6 shows an alternative form of said device as also contemplated by the invention.

There can be seen in FIG. 6 a plurality of nozzles 4 which open into a single casing 1 so as to form a corresponding number of shock structures and to increase the separation surface. An extraction duct 12 evidently corresponds to each shock structure 9 whilst the homogeneity of the gaseous mixture to be separated in ensured by means of a plurality of inlets fitted with valves 3. Any suitable geometry such as, for example, a hexagonal system or square lattice can be adopted for the arrangement of extraction ducts, nozzles and inlets for the mixture to be processed. The ducts and nozzles can be either circular or formed by parallel slits, for example.

In the examples of application which now follows the "separation factor α" will be understood to refer to the ratio $$n_1/N_1/n_0/N_0$$

where n designates the molar fraction of the light component of the mixture, N designates the heavy component, the index 0 corresponds to the initial conditions (prior to enrichment) and the index 1 corresponds to the final conditions (after enrichment).

By way of comparison, the value of the ratio β of the square roots of the masses of the molecules to be separated will be indicated in the case of these examples, this ratio being considered as the maximum to be contemplated for conventional enrichment by gaseous diffusion, this method giving practically only β/2.

EXAMPLE 1

In this instance, the upstream rim 13 of the extraction duct 12 is thinned-down to a sharp edge as shown in the drawings and corresponds to the intersection of an external conical surface having an angle at the vertex which is equal to 70 degrees with an internal conical surface having an angle at the vertex which is equal to 50 degrees, the diameter $D_1$ of said thinner rim 13 being 0.83 mm. The convergent conical nozzle 4 has an outlet diameter of 0.47 mm.

Carbon dioxide $CO_2$ which can readily be eliminated by condensation is selected as auxiliary gas. This gas is admitted into the nozzle 4 at a pressure $P_0$ of 82 millibars. When the mixture to be separated is not present, the pump 7 maintains a pressure $P_1$ of the order of 0.15 millibar within the casing 1. A mixture of helium and argon is introduced into said casing in a proportion $$n_0/N_0 = 0.111$$

in a quantity such that the pressure within the casing 1 becomes $P'_1 = 0.3$ millibar. Under these conditions, the position of the Mach disc as given by the above Formula I is $x = 5.2$ mm.

The auxiliary gas $CO_2$ is removed by condensation in a trap which is maintained at the temperature of liquid nitrogen and located at the outlet of the diffusion pump 14. The mixture which is enriched in helium is withdrawn from said trap and delivered into an ampoule for subsequent analysis by means of a mass septctrometer.

Figure 7:
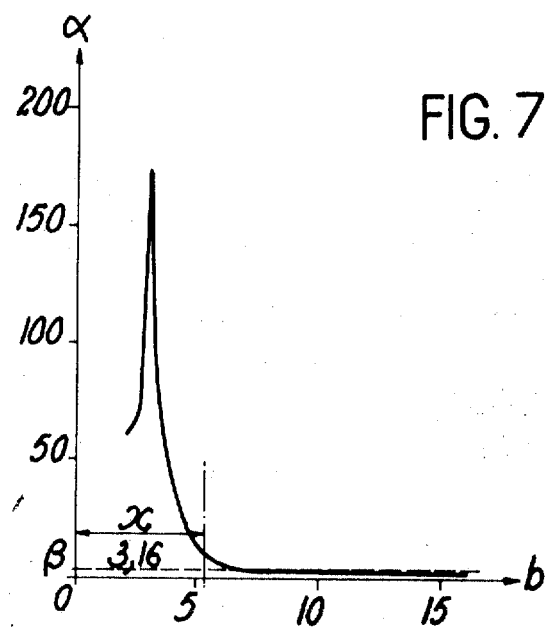
FIGS. 7, 8 and 9 are three graphs which show in the case of different applications the influence of said relative axial position on the separation efficiency.

FIG. 7 gives the variations of the separation factor α (plotted as ordinates) as a function of the axial distance b (plotted as abscissae and expressed in mm.) between the throat of the nozzle 4 and the upstream rim 13 of the extraction duct.

It can be seen that there appears in the vicinity of the value b=2.9 mm. a very narrow critical zone in which the separation factor α attains considerable values, the maximum value (174) being 55 times greater than the ratio β (3.16) which is the maximum to be contemplated in the case of conventional diffusion techniques. It is in the vicinity of this value of b that the upstream rim 13 of the extraction duct just comes into contact with the Mach disc as illustrated in FIG. 5.

EXAMPLE 2

Under the same conditions as in Example 1, but with a diameter $D_1$ of the rim 13 which is equal to 0.42 (instead of 0.83), a maximum value of α of the order of 58 is observed, namely an enrichment which is 18 times greater than the ratio β.

EXAMPLE 3

Under the same conditions as in Example 1, but with a frusto-conical extraction duct 12 having parallel internal and external surfaces (and the same angle at the vertex of 50 degrees), the non-thinned upstream rim 13 having an internal diameter of 2 mm. and a radial thickness of 2 mm., a maximum value of α of the order of 53 is observed, namely 17 times greater than the ratio β.

EXAMPLE 4

Under the same conditions as in Example 3 but operating at low temperature and under a pressure $P_0$ of 229 millibars (instead of 82 millibars), a maximum value of α of the order of 3.3 is observed.

EXAMPLE 5

The conditions are the same as in Example 1 except for the fact that mixture to be processed which is introduced into the casing 1 is natural argon containing 0.3% of argon-36 whilst practically all the remainder consists of argon-40.

Figure 8:
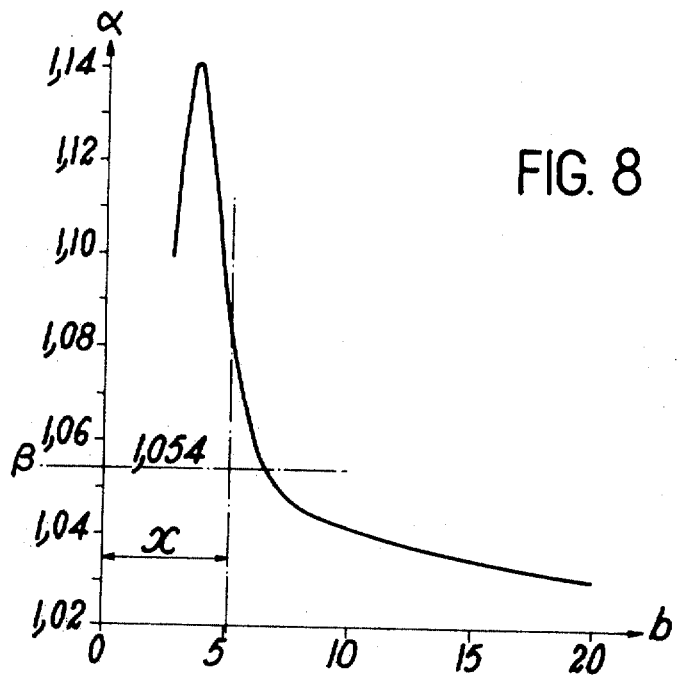

FIG. 8 again gives the variations of the factor α as a function of the distance b.

This figure shows that the optimum values are again concentrated in a narrow zone about b=3.6 mm. with a maximum of 1.14. This corresponds to an enrichment which is three times greater than that which is ideally permitted by the conventional diffusion techniques, the ratio β being equal in this case to 1.054.

EXAMPLE 6

Under the same conditions as in Example 5 but with an extraction duct in accordance with that shown in Example 3, a maximum value of α of the order of 1.11 is observed.

EXAMPLE 7

Under the same conditions as in Example 6 but operating at a low temperature and at pressure $P_0$ of 634 millibars (instead of 82 millibars), $P_1$ of 0.4 millibar (instead of 0.15) and $P'_1$ of 0.9 millibar (instead of 0.3), a maximum value of α of the order of 1.05 is observed.

EXAMPLE 8

Under the same conditions as in Example 5 but with an extraction duct in accordance with Example 3 and an auxiliary gas consisting of ammonia $NH_3$ (instead of $CO_2$), a maximum value of α of the order of 1.09 is observed.

EXAMPLE 9

Figure 9:
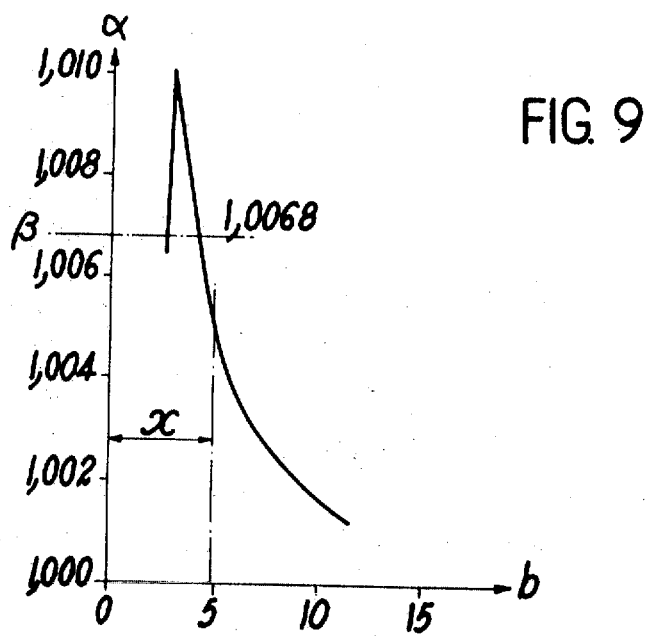

In an apparatus which is similar to that described in Example 1 and under the same conditions of pressure, the isotopes of sulphur ($S_{32}$ and $S_{34}$) in sulphur hexafluoride $SF_6$ have been separated by employing nitrogen as auxiliary gas. A separation factor equal to 1.010 has been obtained whereas the maximum permitted by the conventional diffusion process is 1.0068. This example, which is illustrated in FIG. 9 and which also gives the variations of the separation factor α as a function of the distance b, shows that separation is possible by means of an auxiliary gas which is even much lighter than the mixture to be separated.

EXAMPLE 10

In an apparatus which is similar to that described in Example 1, the separation of the argon isotopes (36 and 40) is carried out with sulphur hexafluoride $SF_6$ as auxiliary gas. In the case of pressures $P_0=31.6$ millibars, $P_1=5\times10^{-2}$ millibars and $P'_1=1.45\times10^{-1}$ millibars, a separation factor equal to 1.17 is obtained.

As will be readily understood and has in any case been brought out by the foregoing, the invention is not limited in any sense to the modes of construction and application which have been more particularly contemplated but extends to all alternative forms.

What is claimed is:
1. A process for the separation of molecules of different masses contained in a gaseous mixture; compris- ing the steps of circulating the gaseous mixture within a casing, introducing an auxiliary gas jet into said casing at a different location from said gaseous mixture, said auxiliary gas jet having supersonic velocity, creating a closed shock structure by said auxiliary gas jet and extracting the gas from the interior of the shock structure containing a fraction of the mixture having a high concentration of light molecules.

2. A process in accordance with claim 1, wherein the pressure of the gaseous mixture within said casing is maintained at a value between $10^{-2}$ millibars and 10 millibars.

3. A process in accordance with claim 2, wherein the extraction of the gas being upstream of the Mach disc at the downstream transverse face of the shock structure.

4. A process in accordance with claim 1, said shock structure having symmetry of revolution.

5. A device for the separation of molecules of different masses in a gaseous mixture comprising a casing including an inner perforated partition wall defining an annular chamber for the gaseous mixture to be drawn into the annular chamber, means for circulating the mixture through (a) said casing at low pressure, an opening in said casing for the admission of a jet of auxiliary gas under pressure for free expansion creating a shock structure within said casing, inlet means including an admission tube for the gaseous mixture which is spaced from said auxiliary gas inlet and located outside the shock structure, a discharge duct in said casing, and means associated with said discharge duct for removal of a gas fraction within the interior of the shock structure enriched in light molecules, said means projecting into the interior of said casing opposite said opening for the admission of the auxiliary gas.

6. A device in accordance with claim 5, said means for circulating the gaseous mixture pumping said mixture outside the shock structure and disposed radially around the entire periphery of the jet of auxiliary gas.

7. A device in accordance with claim 5, said opening and said discharge duct having a circular cross-section and a common axis.

8. A device in accordance with claim 7, said casing having symmetry of revolution with respect to said common axis.

References Cited

UNITED STATES PATENTS

| | | | |
|---|---|---|---|
| 3,109,721 | 11/1963 | Zenner et al. | 55—15 |
| 3,199,270 | 8/1965 | Oehlrich | 55—261 |
| 3,213,592 | 10/1965 | Rich | 55—15 |
| 3,320,722 | 5/1967 | Lucas | 55—17 |
| 3,362,131 | 1/1968 | Becker et al. | 55—17 |

FOREIGN PATENTS

| | | | |
|---|---|---|---|
| 794,834 | 5/1958 | Great Britain | 55—17 |

REUBEN FRIEDMAN, Primary Examiner

C. N. HART, Assistant Examiner

U.S. Cl. X.R.

55—277